United States Patent Office 3,539,393
Patented Nov. 10, 1970

3,539,393
SUGAR CLARIFICATION PROCESS
Rene N. Silva, Ridgewood, and Irving B. Remsen, Ramsey, N.J., assignors to Ritter Pfaudler Corporation, Rochester, N.Y., a corporation of New York
No Drawing. Filed June 12, 1968, Ser. No. 736,270
Int. Cl. C13d 3/00, 3/14
U.S. Cl. 127—51      10 Claims

ABSTRACT OF THE DISCLOSURE

A method for the clarification of a cane or beet sugar solution comprising two-step heating with chemicals in which the sugar solution is initially treated with alum and pH stabilized with lime prior to the first heating and activated silica is added either before or after the second heating after which the solution is softened or deionized to remove scale forming minerals and/or other dissolved ions. A hold for purposes of permitting precipitation to occur is provided both before and after the final heating step and at no time is the solution heated above boiling.

BACKGROUND OF THE INVENTION

The present invention relates to a process for treating raw sugar juices and more specifically to a process for clarifying and softening or deionizing a cane or beet sugar juice solution to remove nonsucrose impurities which otherwise would interefere with the subsequent crystallization of the sugar or degrade the quality of the crystalline sugar.

The initial step in the production of raw sugar from cane involves the extraction of the juice by crushing or diffusing the cane to separate the juice or sweet water portion from the pulp. In the process the crushed cane or "bagasse" is macerated with water and passed through several cane mills to insure maximum extraction of the juice. The juice thus recovered is a turbid, dark colored liquid, containing large amounts of gum, wax, protein, organic acids, ash or mineral constituents, soil, coloring matter, fine particles of suspended vegetable matter and other nonsucrose impurities which must be removed before the raw juice can be worked up into a high quality sugar. After removal of these impurities or clarification, the juice is fed to evaporation equipment to evaporate water and other volatile components and crystallize the sugar.

The most common method of clarifying the raw sugar juice to remove as much of the nonsucrose impurities as possible is to add milk of lime to the raw sugar juice and boil. Milk of lime is added, for example, to neutralize the organic acids present in the raw juice in order to prevent inversion of the sucrose which occurs in the acidic environment of the raw juice. Furthermore, milk of lime acts upon the gums, proteins, waxes and other foreign matter in the raw juice to form largely insoluble compounds which precipitate or rise to the surface of the juice and are easily removed.

The amount of lime added is a critical factor. Too much lime will darken the sugar juice, form calcium saccharate and increase the molasses output. The increase in the calcium content of the juice in the form of calcium saccharate in turn produces more scale deposits on the evaporation equipment used to crystallize the sugar from the clarified sugar juice. On the other hand, too little lime may result in loss of sucrose through inversion in the unneutralized acid environment of the sugar cane juice and inefficient precipitation of the nonsucrose impurities.

With respect to adding too much lime to the juice, it has been estimated that a typical mill may spend between $60,000 and $90,000 each year for cleaning the evaporators with the greater proportion of this amount being spent to remove scale. Moreover, in some instances, the scale problem and downtime needed to clean the equipment are so acute that a mill must have at least three evaporators in order to keep two in operation at any given time. While ion exchange apparatus for softening or deionizing solutions are known, such apparatus has heretofore proved unsuitable for use in softening sugar solutions primarily because prior clarification processes failed to remove a large number of color bodies and a considerable amount of colloidial material which act to irreversibly foul the ion exchange apparatus whenever softening is attempted.

The other main feature of prior clarification processes, namely boiling the limed juice, also serves several functions such as killing the micro-organisms which otherwise would cause the juice to ferment, and aiding in the coagulation of much of the proteinaceous or albuminoid matter and other nonsucrose impurities. However, while boiling the juice promotes coagulation of the nonsucrose impurities and acts to kill fermenting-causing bacteria, boiling is objectionable in that exposure of the juice to high temperature promotes inversion of sucrose in a degree related to the time of exposure and reduces the amount of sugar eventually recovered.

Thus, regardless of the drawbacks of adding too much lime to the juice, prior art processes recommended adding sufficient lime to provide a high degree of clarification. In such cases, boiling speeded the coagulation of the nonsucrose impurities and killed the micro-organisms present in the raw sugar juice. The loss of sucrose by boiling through inversion in the clarifier and the expenses incurred because of scale formation on the evaporators were tolerated in order to realize the benefits of a clarified sugar solution which could be used in the manufacture of raw sugar.

SUMMARY OF THE INVENTION

In the clarification process of our invention, about 1,000 to 2,600 p.p.m. of a chemical coagulant such as alum is first added to the raw sugar juice as produced while maintaining the pH substantially constant between 6.0 and 6.9 by adding lime. The pH of the raw sugar juice is then readjusted with lime to between 7.1 and 7.8 to neutralize the natural acids and the temperature of the juice raised if necessary, to a temperature not exceeding 120° F. If the weather is sufficiently hot or the cane macerated with condensed steam, the warmed temperature of the juice may be already warm enough for purposes of the process of the present invention. In any case, after this first warming a coagulant aid such as activated silica is added to the juice and the process is held at temperature to permit the formation and precipitation of a heavy floc and a floating scum. After the precipitates and scum of the first stage have been removed, the sugar juice is heated to just below the boiling point and held at this temperature to permit a second precipitation. Additional activated silica or other suitable coagulant aid may be added to further the second precipitation after the juice is brought to temperature. These precipitation stages, completed in ¾ to 1½ hours, leave a supernatant which is clear amber in color containing little or no colloidal material which can be softened or deionized to remove scale forming minerals without excessive fouling of the ion exchange apparatus. Thus, the process of our invention produces a greatly clarified sugar solution in 1½ hours or less which reduces the amount of sugar lost through inversion and at no time during the clarification process is the solution brought to a boil. Moreover, since the clarified solution can be successfully softened to remove scale forming minerals, the cost of maintenance, repair and replacement of the evaporating equipment is greatly reduced.

OBJECTS OF THE INVENTION

The primary object of the present invention is to provide an improved process for clarifying cane or beet sugar juices to produce a clarified softened or deionized sugar solution suitable for working up into a high quality sugar.

Another object of the present invention is to provide a process for the clarification of sugar cane juices which includes the step of softening or deionizing the juice.

A further object of the present invention is to provide a process for the clarification of sugar cane juices in which the chemically treated juice is softened to remove calcium and other scale forming minerals.

A still further object of the present invention is to provide a process for clarifying sugar cane juices in which the temperature is raised in two steps to a temperature at or below the boiling point of the juice, thereby reducing the possibility of sucrose inversion by overheating.

A yet further object of the present invention is to provide a process for the clarification of sugar cane juices in which the feeding of chemicals in the process is coordinated with a stepwise temperature increase to obtain precipitates at each increase in temperature.

Another object of the present invention is to provide a process for the clarification of sugar cane juices in which the first feeding of chemicals to the juice is accomplished while maintaining constant pH.

Sitll another object of the present invention is to provide a process for the clarification of sugar cane juices in which employs at least two precipitation stages.

These and other objects, advantages and characterizing features of our invention will become more apparent upon consideration of the following detailed description thereof.

DESCRIPTION OF THE PREFERRED EMBODIMENTS

To the starting material, which can be cane or beet juice, we add at room temperature about 1,100 to 2,000 p.p.m. of any suitable coagulant, such as alum, to the juice. It should be understood that the specific dosage of coagulant will vary according to the type of cane or beet used and the conditions such as soil, weather, and fertilizer under which the cane or beet is grown. Since alum is acidic in nature, we have found that adding alum alone lowers the pH of the raw juice to such an extent that inversion of the sucrose results in a short time. Accordingly, while alum is being added, we also add sufficient lime to maintain the pH value of the alum-sugar juice solution between 6.0 to 6.9.

We then allow the mixture to stand for a chemical reaction time of between 0.1 and 2.0 minutes in order to insure relatively complete mixing and chemical reaction. After this hold period, we add sufficient lime to raise the pH of the solution to between 7.0 to 7.8.

We then warm the solution to a temperature not to exceed 120° F. and hold at this temperature for a period of between 0.1 to 2.0 minutes. We have found that at this temperature, which is well below the boiling point of the solution, a pin point floc of the coagulant develops. In order to aid the coagulation and precipitation of the floc, we then add any suitable coagulant aid, such as activated silica in the amount of approximately 3% to 7% of the alum previously added to the solution. Coagulation and precipitation begins as the silica is added, and we have found that after a hold of 15 to 30 minutes, approximately 85% to 90% of the floc has precipitated while 10% to 15% is floated as a scum, leaving an intermediate gray blacklish liquid. After removal of the precipitates and scum, we then raise the temperature of the remaining liquid. We prefer not to bring the liquid to a boil but to heat the liquid to a temperature below the boiling point. We hold the liquid at this temperature for 15 to 30 minutes, while a whitish precipitate from and rapidly settles. A coagulant aid, such as activated silica, can be added after the solution reaches temperature, so as to further speed precipitation. The supernatant which remains after this second precipitation is clear amber in color, with little or no colloidal material remaining. Brix, sucrose and purity analysis of the supernatants from both the first and second precipitation stages shows little or no loss of sucrose. The supernatant is sufficiently free of color bodies and colloidal material to permit passing the liquid through an ion exchange apparatus without excessively fouling the ion exchange resin.

Example I

To 1,000 ml. of sugar cane juice at room temperature and a pH of 5.6, we add sufficient alum to produce a concentration of 2,000 p.p.m. We monitor the pH of the solution as the alum is being added and add together with the alum a sufficient amount of lime to maintain the pH of the solution between 6.0 and 6.9. We then add an amount of lime sufficient to raise the pH of the solution to 7.5 and warm the solution to 115° F. and hold at this temperature until a pin point floc starts to form. We then add activated silica in the amount of 6.25% of the amount of alum previously added and transfer the solution to a separatory funnel where a blackish floc precipitates and a small amount of floating scum develops leaving an intermediate liquid. After fifteen minutes in the separatory funnel, the precipitates and scum are removed and the liquid transferred to a beaker and heated to 210° F. The liquid is then transferred back to the separatory funnel and allowed to precipitate for another fifteen minutes during which time a whitish precipitate settles, leaving a clear amber supernatant having a hardness of 2,000 p.p.m. of $CaCO_3$. The analysis of the supernatant shows that no sucrose is lost during the process. The supernatant is then passed through a bed of cation ion exchange which lower the total hardness of the solution to 0.1 p.p.m. without fouling the ion exchange apparatus.

Example II

To 1,000 ml. of sugar cane juice at a temperature of 90° F. and a pH of 5.4, we add sufficient alum to produce a concentration of 1,200 p.p.m. We monitor the pH of the solution as the alum is being added and add together with the alum a sufficient amount of lime to maintain the pH of the solution between 6.0 to 6.9. We then add an amount of lime sufficient to raise the pH of the solution to 7.2. We then transfer the solution to a separatory funnel where a blackish floc precipitates and a small amount of floating scum develops leaving an intermediate liquid. After twenty minutes in the separatory funnel, the precipitate and scum are removed and the liquid transferred to a beaker and heated to 210° F. Activated silica in the amount of 6% of the amount of alum previously added is then added to the heated juice and the liquid transferred back to the separatory funnel and allowed to precipitate for thirty minutes during which time a whitish precipitate settles, leaving a clear amber supernatant having a hardness of 1,700 p.p.m. of $CaCO_3$. The analysis of the supernatant shows that no sucrose is lost during the process and after the supernatant is passed through a bed of cation, ion exchange resin the total hardness of the solution is lowered to 0.1 p.p.m. without fouling the ion exchange apparatus.

Example III

Two tons of cane was ground, then in the primary clarification, the mixed juice was limed to 6.3 to 6.5 pH and treated with 1,600 p.p.m. of alum. The treatment was in three dosages with the pH being adjusted prior to each dosage. The treated juice was then limed to a pH of 7.2 and pumped to the batch settlers with the addition of 3.47 liters of silica per 90 gallons (approximately) of juice, the amount of silica added being about 6.2% of the amount of alum previously added. After a settling time of approximately thirty minutes, the clarified juice was returned to the batch treating tanks for a secondary clarification. This consisted of heating the juice to 207° F. and again settling. After about one hour's settling time the clarified juice was pumped through a softener without fouling the ion exchange resin, to an evaporator feed tank, after which the softened juice was evaporated to syrup.

Thus, it will be appreciated that the present invention accomplishes its intended objects providing an improved process for removing nonsucrose impurities and scale producing minerals from sugar cane or beet juices which would otherwise interfere with the subsequent crystallization of the sugar or degrade the quality of the sugar. The clarification process is completed in 1½ hours or less and produces a clear amber solution which after treatment with a cation exchange resin can be fed directly to the evaporators to crystallize sugar of a high degree of purity without depositing and excessive amount of scale on the evaporating equipment. Furthermore, at no time is the sugar solution brought to a boil during the clarification process, thereby minimizing the loss of sugar by overheating.

While we have described the preferred embodiments of our invention, it will be readily apparent that other modifications can be made therein without changing the spirit and scope of the invention as set out in the appended claims.

Having thus described our invention in detail, what we claim as new is:

1. A method for the clarification of a vegetable sugar juice solution comprising the steps of:
    (a) adding alum to said sugar juice solution while maintaining said solution at a substantially constant pH;
    (b) adjusting the pH of said solution resulting from step (a) to about 7.0 to 7.4;
    (c) warming said solution resulting from step (b);
    (d) adding a chemical coagulant aid to said warmed mixture of step (c) to obtain a first precipitate and a liquid; and
    (e) heating said liquid to a temperature between the temperature of step (c) and the boiling point of said liquid to obtain a second precipitate and a clarified sugar solution.

2. The method as set forth in claim 1 further comprising the step of softening said clarified sugar solution.

3. The method as set forth in claim 1 comprising heating said liquid to not more than 210° F. in step (e) to obtain said second precipitate.

4. The method as set forth in claim 1 comprising adding said alum of step (a) after heating in step (e).

5. A method as set forth in claim 1 comprising adding together with said alum at step (a) an amount of a chemical base sufficient to maintain the pH of said solution substantially constant as said alum is added.

6. The method as set forth in claim 1 comprising warming said solution at step (c) to a temperature not to exceed 120° F.

7. The method as set forth in claim 6 further comprising the step of holding said warmed solution at said warming temperature until a floc of said alum appears.

8. The method as set forth in claim 1 comprising adding said alum at step (a), in a quantity equal to a concentration of about 1,100 to 2,600 p.p.m. of said sugar juice solution.

9. The method as set forth in claim 8 comprising adding said chemical coagulant aid at step (d) in an amount equal to about 3% to 7% of said alum added in step (a).

10. The method as set forth in claim 9 in which said chemical coagulant aid is activated silica.

References Cited
UNITED STATES PATENTS

| | | | |
|---|---|---|---|
| 748,313 | 12/1903 | Salisbury | 127—48 |
| 1,399,533 | 12/1921 | Wierusz-Kowalski | 127—51 |
| 1,724,376 | 8/1929 | Schreiber | 127—50 X |
| 2,626,878 | 1/1953 | Bartz | 127—48 X |
| 3,248,264 | 4/1966 | Welch | 127—48 X |

JOSEPH SCOVRONEK, Primary Examiner

S. MARANTZ, Assistant Examiner

U.S. Cl. X.R.

127—48